G. W. DONNING.
TYPE WRITER.
APPLICATION FILED FEB. 2, 1910.

1,004,538.

Patented Sept. 26, 1911.

WITNESSES:
James Atkins
Frank A. Kane

INVENTOR
George W. Donning
BY
Edmund H. Parry
ATTORNEY

G. W. DONNING.
TYPE WRITER.
APPLICATION FILED FEB. 2, 1910.

1,004,538.

Patented Sept. 26, 1911.
8 SHEETS—SHEET 2.

WITNESSES:
James Atkins.
Frank A. Kane

INVENTOR
George W. Donning
BY
Edmund W. Parry
ATTORNEY

G. W. DONNING.
TYPE WRITER.
APPLICATION FILED FEB. 2, 1910.

1,004,538.

Patented Sept. 26, 1911.
8 SHEETS—SHEET 5.

WITNESSES:
James Atkins
Frank A. Kane

INVENTOR
George W. Donning
BY
Edmund W. Parry
ATTORNEY

COLUMBIA PLANOGRAPH CO., WASHINGTON, D. C.

UNITED STATES PATENT OFFICE.

GEORGE W. DONNING, OF STAMFORD, CONNECTICUT.

TYPE-WRITER.

1,004,538. Specification of Letters Patent. Patented Sept. 26, 1911.

Application filed February 2, 1910. Serial No. 541,544.

*To all whom it may concern:*

Be it known that I, GEORGE W. DONNING, a citizen of the United States, residing at Stamford, in the county of Fairfield and State of Connecticut, have invented certain new and useful Improvements in Type-Writers, of which the following is a specification.

This invention relates to typewriters, and particularly to that class thereof in which a flat platen is employed to sustain the work-sheet.

The invention is especially adapted for use in connection with book-typewriters wherein there are utilized, (1) a track-frame for supporting the printing-mechanism, (2) a book-support, and (3) a flat platen overlying the book-support. Herein, I have disclosed my invention as applied to a "Donning machine", the general construction and arrangement of parts of which are well revealed in my United States Patents, Nos. 826,482, granted July 17, 1906; 826,483, granted July 17, 1906; 826,487, granted July 17, 1906; 840,203, granted January 1, 1907; 840,122, granted January 1, 1907; 841,017, granted January 1, 1907, and 879,815, granted February 18, 1908. It is manifest, however, that the invention may conveniently be applied to any form of table whereon a book is supported.

The object of the invention is, primarily, to provide (in connection with a book-typewriting machine, in which a suitable track-frame is employed to support a traveling printing-mechanism) a flat platen adapted to be shifted beneath and transversely of said track-frame, whereby access to the underlying book and book-support is afforded, and manipulation of its pages with relation to, or independently of, said platen is facilitated.

Another object is to provide a support for said transversely-shiftable platen whereby the latter may quickly and conveniently be positioned beneath or away from the track-frame which normally overlies it.

A further object is to construct the said platen-support in such form that the platen may be positioned in one of a plurality of horizontal planes; that is to say, in one plane normally when underlying said track-frame, and in a different plane, when occupying its shifted position, namely, the position to which it is moved when shifted from beneath the track-frame; in other words, the construction and arrangement of the parts are such that the platen may alternately occupy one position and plane normally, and then be shifted to a different position and plane to give access to the underlying book or book-support.

A further object is to provide means for securely retaining the platen in normal position, whereby it may be fixed against displacement, accidental or otherwise.

Other objects will be apparent from the description of the structure as hereinafter set forth.

With these several objects in view, the invention resides in the construction and arrangement of parts, as hereinafter described and claimed.

In the accompanying drawings, I have illustrated a preferred form of construction characterized by my invention, and in these drawings.

In these drawings: A designates a table; B a laterally-shiftable book-support sustained therein; C a platen; D, $D^2$ platen-supporting tracks or guides; E a tiltable track-frame; and F a printing-mechanism supported on said frame and comprising a line-space-carriage $F^2$ and a letter-space-carriage $F^3$.

Figure 1:
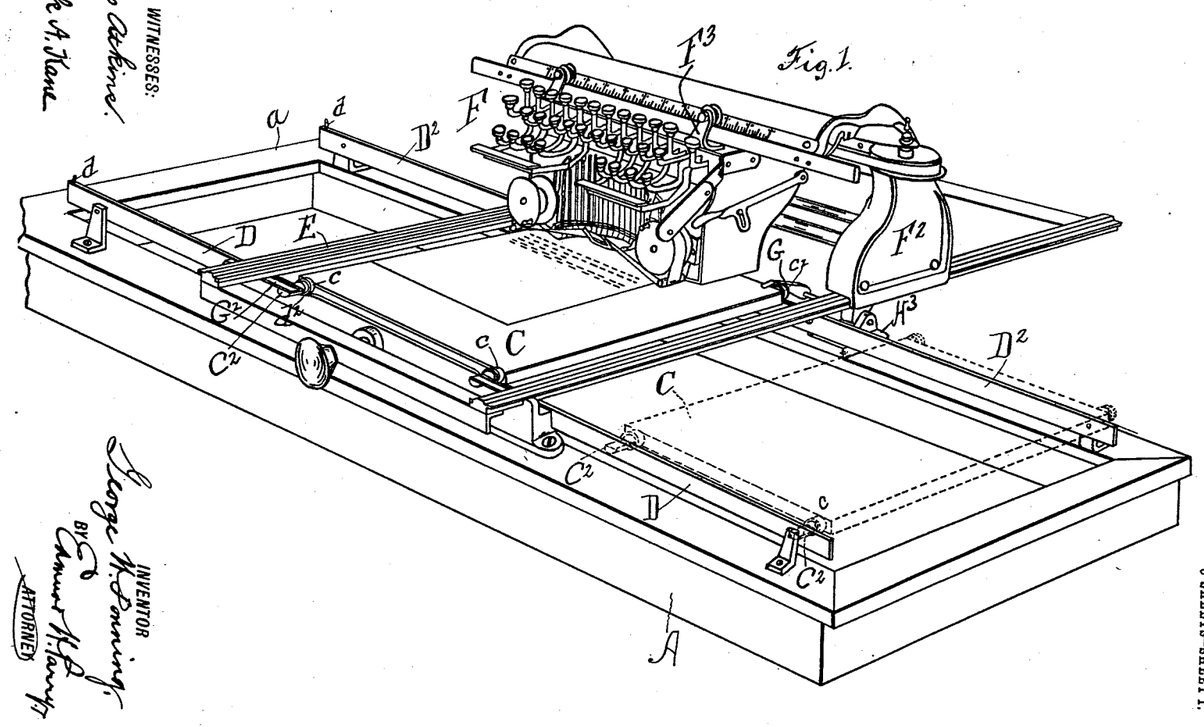
—Figure 1 is a view in perspective showing my invention applied to a "Donning machine",—my improved form of platen being shown in normal position in full lines, with the track-frame disposed in its normal position and supporting a traveling printing-mechanism comprising a laterally-shiftable or letter-space carriage, and a longitudinally-shiftable or line-space carriage; said platen being also shown, in dotted lines, in one of its shifted positions.
Figure 2:
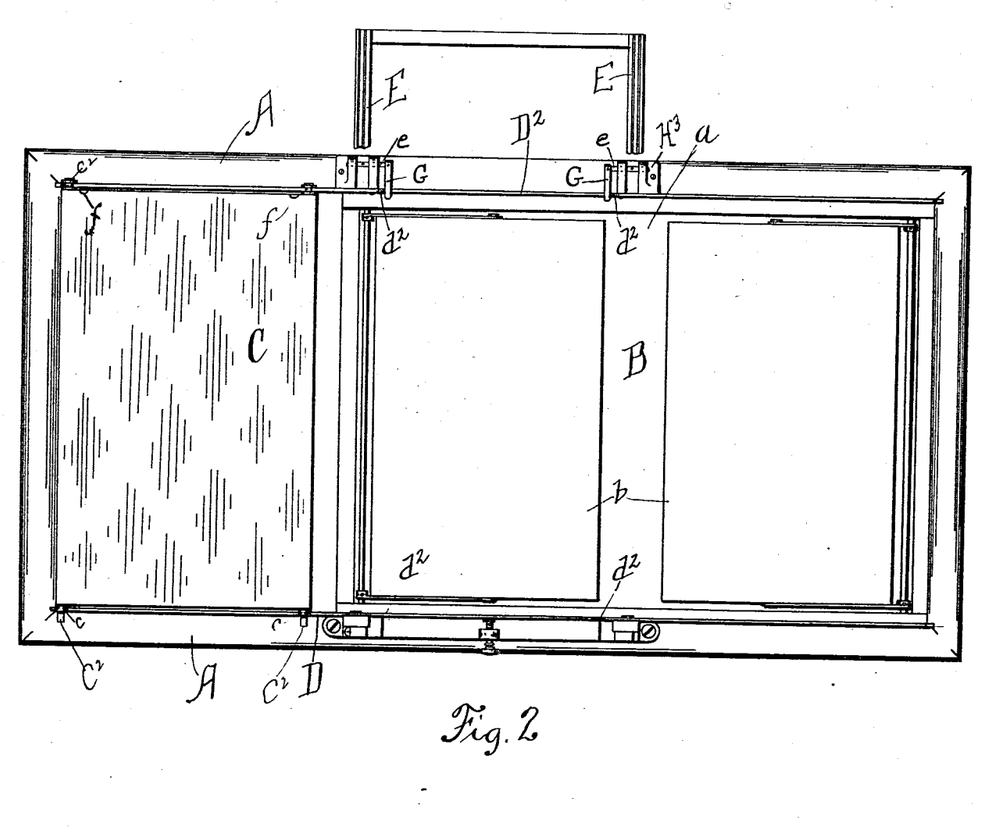
Fig. 2 is a view in plan thereof,—the track-frame being broken away, the printing-mechanism-carriages being omitted to show the underlying parts more clearly, and the platen appearing as shifted to the left-hand side.
Figures 3, 6:
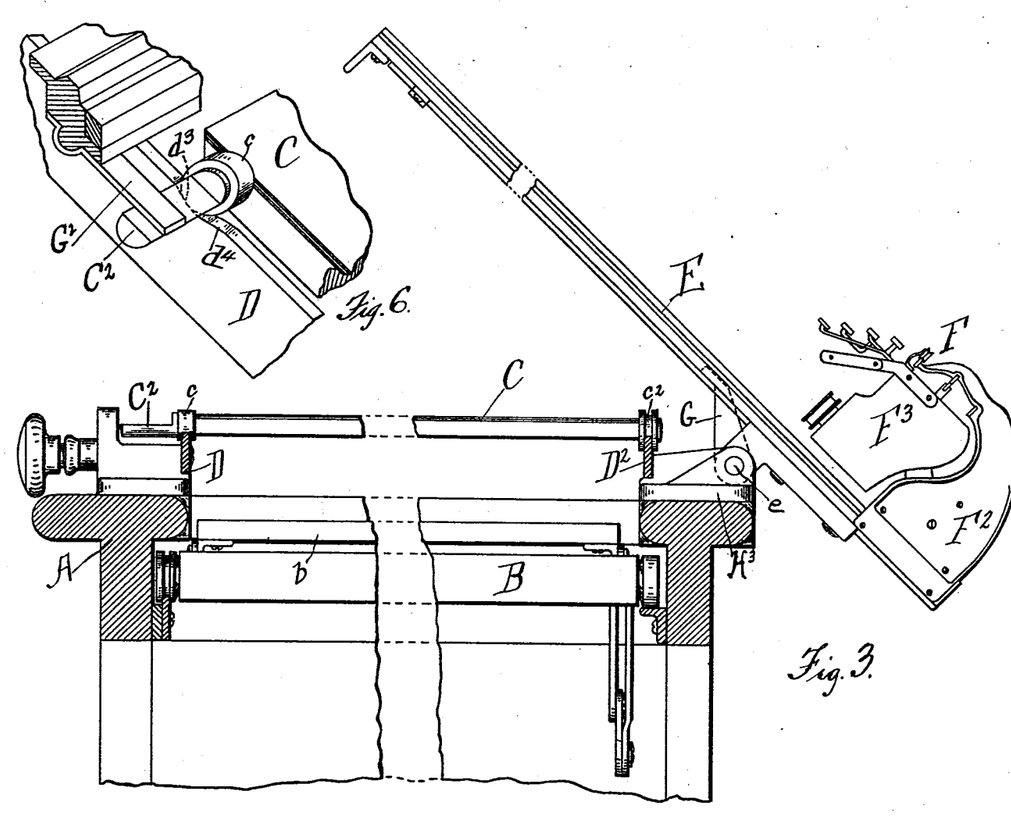
Fig. 3 is a view in end elevation, partly in section.
Fig. 6 is a detail view of one of the platen-rollers, and showing the formation of the platen-supporting-track at the point where it is engaged by the platen-roller when the platen is in its normal position.

Referring now to Figs. 1-9, inclusive, it will be seen that the table A is provided with a rectangular opening $a$ in which the laterally-shiftable and vertically-adjustable book-support B is disposed, and suitably supported. Said book-support comprises interdependently rising and falling leaves $b$ $b$ upon which the respective sides of a book are sustained. The structure of this book-support and the manner of supporting it are fully disclosed and claimed in United States Letters-Patent No. 826,482, granted July 17, 1906; and as the details of the same form no part of my present invention, a detailed description thereof will not be necessary. The platen C is, as shown, of length sufficient to span the depression $a$. Suitably mounted upon the top of the table A, and adjacent the side-walls of said opening $a$, are the two tracks or guides D, $D^2$ arranged parallel to each other, and preferably extending to nearly the ends of the table A. At the extremities of each track are limit-stops or abutments $d$, $d$. As well shown in Figs. 4 and 6, the operative edge or tread of each track or guide is provided (intermediate of the rails E of the line-space-carriage frame) with two depressions, recesses or incuts $d^2$, $d^2$, one surface $d^3$ of the depressed portion of the tread being of relatively greater pitch than that of the other ($d^4$) to form an abutment which aids in maintaining the platen in position. Suitably mounted on the edges of the platen C, adjacent the four corners thereof, are front and rear rollers $c$ and $c^2$, designed to traverse the tracks D and $D^2$ and normally to rest in the depressions or recesses $d^2$. The front rollers are preferably flat on their periphery (as shown in Figs. 3 and 6), whereas the rear rollers $c^2$ are grooved, whereby their travel over the tracks $D^2$ is effectually guided, and displacement of rollers from the tracks is prevented. By the employment of these rollers, the shifting of the platen is very greatly facilitated and amounts practically to mounting said platen on roller-bearings. The depressions $d^2$, aforementioned are separated from each other the distance between the rollers $c$ on the platen, so that each roller will rest in its respective depression, and, while so positioned, the platen will occupy its normal horizontal plane, or that in which it must be to receive impressions from the printing-mechanism.

Figure 4:
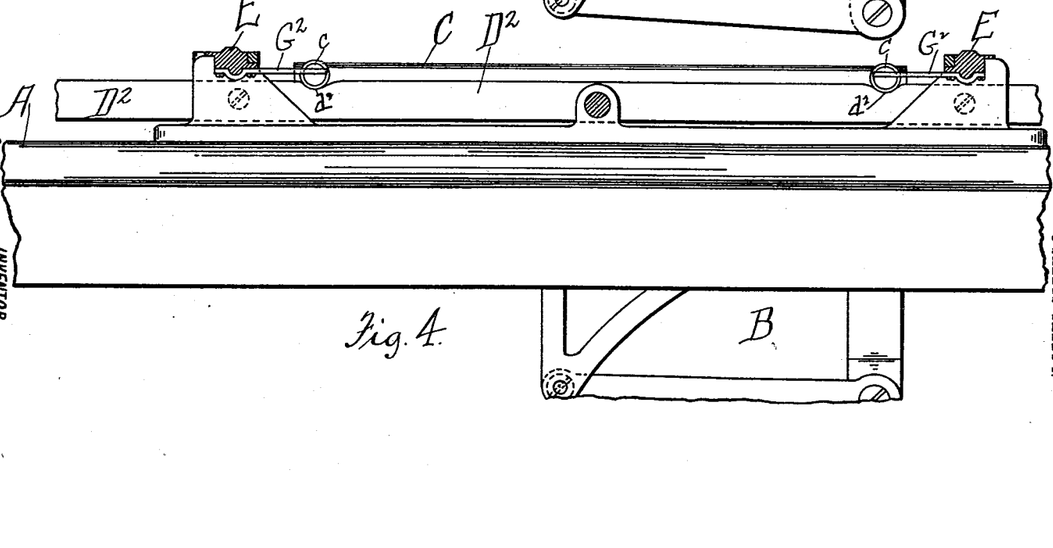
Fig. 4 is a fragmentary view, in front elevation, partly in section.
Figure 5:
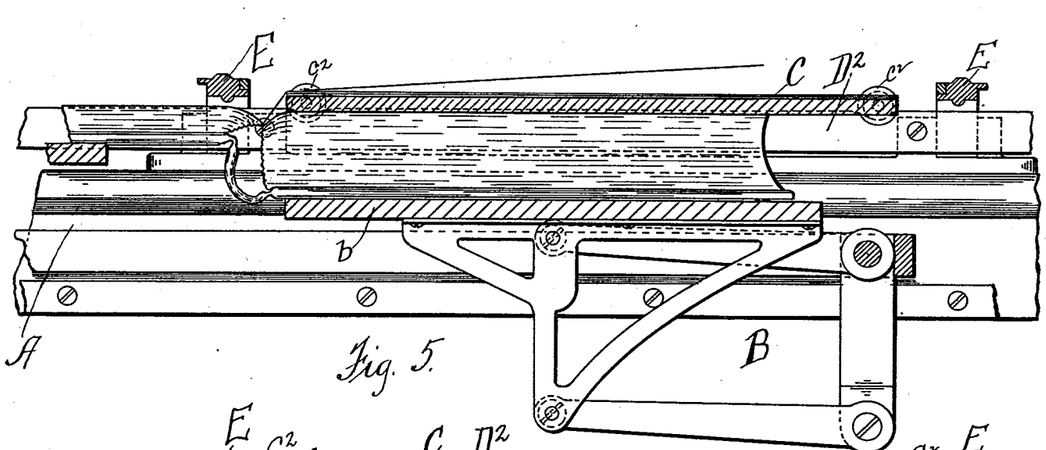
Fig. 5 is also a fragmentary view, in vertical transverse section.
Figure 7:
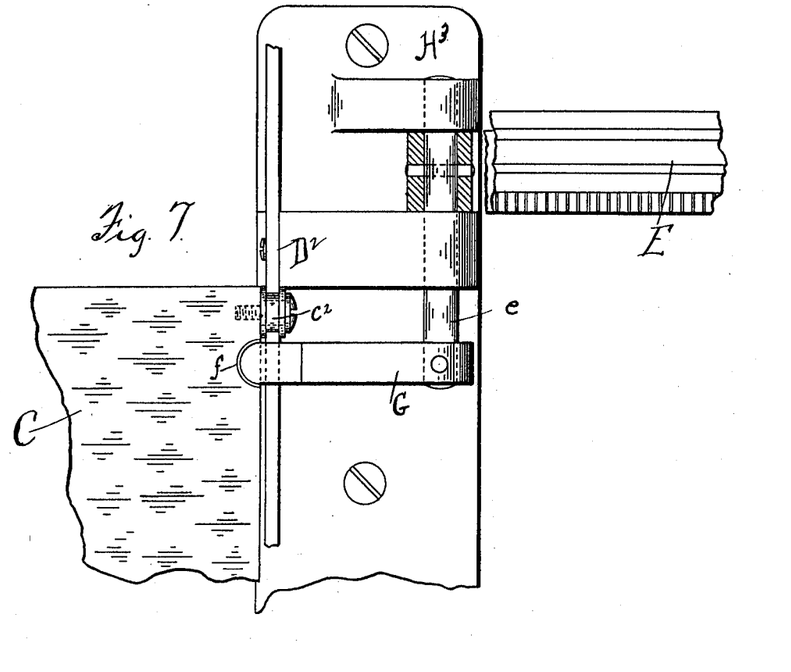
Figs. 7 and 8 are fragmentary views, in plan and in side elevation of the frame-operated holding-device for retaining the platen in position.
Figure 8:
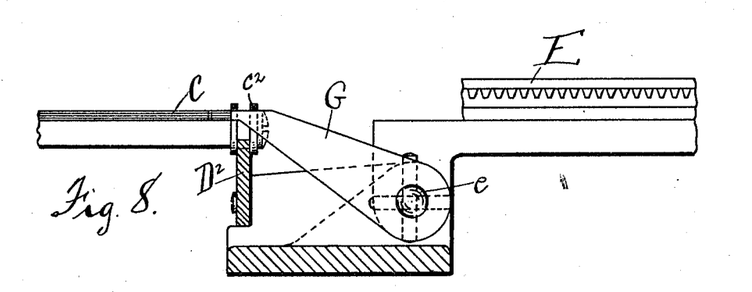
Figure 9:
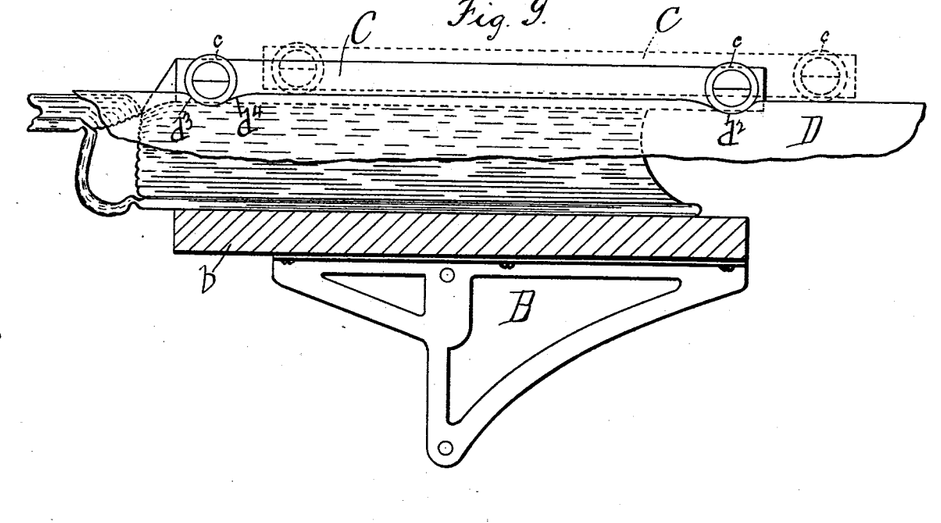
Fig. 9 is a view in front elevation, showing, in full lines, the platen in its normal position and plane and, in dotted lines, in its shifted position, wherein it occupies a plane relative above that which it occupies when in normal position.

It will be understood that the platen is designed to occupy, as a normal position, that in which it is shown in Figs. 4 and 5. When so positioned, it will overlie the central portion of the platen-tracks D and $D^2$ and the platen-rollers will be seated in the depressions $d^2$ and be held, with more or less security, against lateral movement by the abutments $d^3$. In the event that the platen is tilted, as in Fig. 10, these parts, just described, will facilitate the operation. Moreover, should the operator desire to have access to the book (which normally underlies the platen) and without having to displace the leaf of the book sustained by the platen, she would merely grasp the side of the platen (similarly as she would the book-leaf were the platen not sustaining it) and raise the platen and, in consequence, the book-leaf also. Upon completion of her inspection, she would lower the platen. The book-leaf would remain in position on the platen during the tilting and, when the platen is again lowered, the leaf will have been lowered also, and not then again required to be readjusted on the platen.

By providing the tread of the platen-tracks with the recesses $d^2$, the platen normally occupies its lowest horizontal plane, and when it is shifted onto the level portions of the tracks, it is thereby positioned in a plane above that which it normally occupies; that is, in a plane different from that which it occupies when lying in its printing-receiving position. In rising, thus, to the higher plane, it disengages from the book (which normally underlies it and which is pressed up against its under surface by the book-support) and, in consequence, is prevented from touching and soiling or smearing the page as it, the platen, continues its travel toward the end of the platen-tracks.

It will have been understood, of course, that the purpose of positioning the platen onto the rest-portion of the platen-tracks and, thus, to one or the other side of the normal printing-area of the machine, is to expose the entire book, whereby the leaf written on may be turned, or the book positioned or adjusted on or by its support. When the platen is so shifted, it is in a position to be utilized as a support for the "copy," carbon, etc.

The track-frame E, in this instance, is fulcrumed on the pivots $e$, and is tiltable as shown in Fig. 3, though, obviously, my invention will operate in conjunction with a non-tiltable track-frame. The frame is preferably disposed sufficiently high above the plane of movement of the carriage that the latter will not abut against it. Moreover, the side-members of the frame are outside the vertical plane of the edges of the platen.

Keyed or otherwise secured to the pivot $e$ upon which the track-frame E is fulcrumed are two platen-locking arms G (Figs. 1, 3, 7 and 8), each of said arms being actuated toward and away from the plane of the platen whenever the track-frame is lowered or tilted. They are so mounted on the pivots $e$ as to be brought in firm contact with the upper surface of the platen, and to rest in recesses $f$ in the face of the platen, and when so positioned, operate to hold the rear portion of the platen in the recesses $d^2$, wherefore, the platen is thus held against displacement or edgewise shifting while the track-frame occupies its normal position. When it is tilted, the arms are likewise tilted, and the platen is released at the rear. Projecting transversely from the inner portion of the tracks E, at their forward ends, is another set of platen-locking arms $G^2$ which are designed to engage with the upper flat face of studs $C^2$ which form the axles of the front rollers $c$. These arms, when in engagement with said studs, serve to hold the rollers $c$ in the recesses $d^2$ in the track D; and thereby prevent displacement or edgewise shifting of the platen. When the track frame E is tilted, the arms $G^2$ are disengaged from the studs $C^2$, and the platen is then released at the front. It will be seen, therefore, that I have thus provided a convenient means for locking the platen in normal position, and that such means are operated automatically by the track-frame.

As will be apparent, the platen-rollers are so mounted on the platen that the latter may be reversed, in which event, the studs $C^2$ would be rotated on their longitudinal axes to present the flat face uppermost. This is of importance where it is desired to have two writing-surfaces of different characteristics—one soft and the other hard. It is, in this construction, only necessary to turn the platen over if the opposite face is to be utilized.

It will now be apparent that I have, by the structure herein disclosed, provided a platen possessing several important characteristics. In the first place, it is readily removable for any purpose desired. In the second place, by reason of this feature of removability, another platen may be substituted for the one removed, so that there is, thus, the feature of interchangeability. In the third place, it is horizontally-shiftable to a plurality of positions relative to the book-support and track-frame. Again, it is capable of occupying a position in one plane, when in normal position, and, when shifted, to occupy a position in, relatively, a higher plane. In the fourth place, it may be tilted onto one or another of its edges.

I am aware of the fact that it has heretofore been proposed to provide one or more horizontally and longitudinally-slidable platens; and, also, a platen capable of being adjusted vertically. My invention is to be distinguished from the first-mentioned, the laterally-slidable platen, in that it is, in the first place, utilized in connection with a printing-mechanism which is capable of being shifted laterally as well as longitudinally; in the second place, employed in connection with a laterally-shiftable book-support,—shiftable in the same direction as said platen may be moved; and in the third place, being supported and manipulated independently and irrespective of the track-frame, may be shifted laterally and into a relatively different plane without a shifting of the said track-frame. The invention is to be distinguished from the second-mentioned construction, the vertically adjustable platen, in that it moves into its relatively higher plane when being shifted out of its normal position, and, in moving into said higher plane, it is advantageously positioned away from the book which had theretofore been pressed firmly against its underface by the underlying book-support. Moreover, the book-support, by reason of its construction, is capable not only of being shifted relatively to said platen; but is also capable of being adjusted vertically relative to the under surface thereof. Furthermore, not only is my platen capable of being shifted laterally; but it may be tilted on either of its side edges in any of the positions to which it may be shifted.

Figure 10:
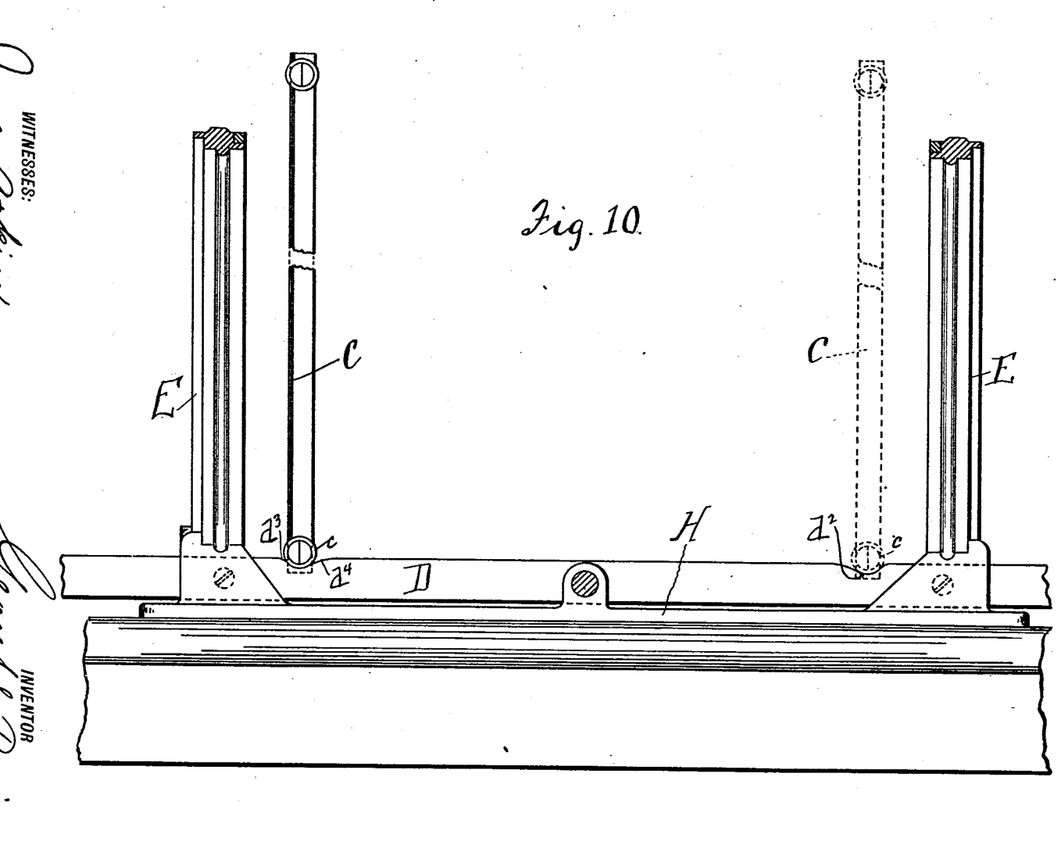
Fig. 10 is a view in front elevation, showing the platen tilted on one edge, in which instance, the platen-rollers at one side form a fulcrum for the platen.

In the prior art, where platens hinged at one edge have been employed, it was necessary for the operator, in tilting the same, to lift what was a heavy and cumbersome burden. Subsequently, a spring for effecting a tilting of the platen was utilized. Being necessarily of great lifting power, it soon warped the platen or that portion to which it was attached and rendered the same useless. Moreover, in the use of a platen arranged to be tilted on its rear edge, it was necessary, when the operator desired to inspect another page of the book, to displace the page of the book which had been overlying the upper face of the platen. In the structure of my invention, the platen is readily manipulated, is shiftable smoothly by reason of the employment of the rollers described, and is capable of being positioned in and out of relation to the book-support, track-frame, etc., without disturbing or manipulating any of these. The track-frame is tiltable, and so is the platen, as shown in Fig. 10.

It is to be understood, of course, that while I have, in the construction illustrated in Figs. 1–9, shown the platen as capable of occupying two relatively different planes, nevertheless, I may provide forms of abutments other than the depressions $d^2$ which hold the platen in normal position, and maintain the platen always in the same horizontal plane, in its normal and shifted positions.

Figures 11, 12:
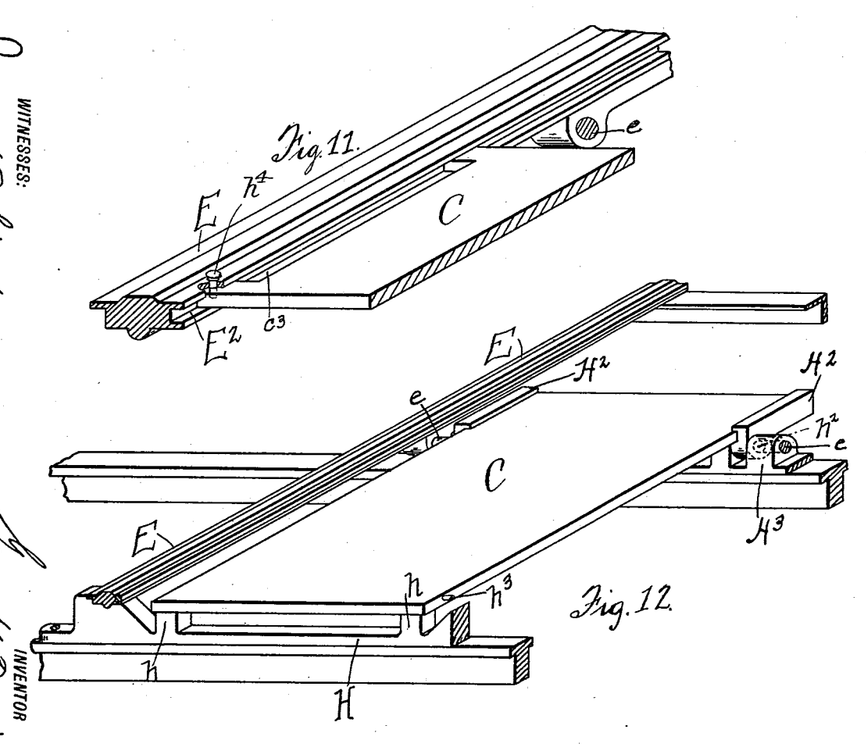
Fig. 11 is a view, in perspective, of a modification, wherein the platen is adapted to be shifted longitudinally.
Fig. 12 is a similar view, of another modification, wherein the platen is adapted to be shifted longitudinally and then tilted downwardly.

In lieu of shifting the platen laterally of the table, etc., as hereinbefore described, I may, as shown in Figs. 11 and 12, provide constructions wherein the platen is shiftable longitudinally.

In Fig. 11, the inner edge of each of the track-members E is provided with an elongated groove $E^2$ in which the side edges of the platen slide back and forth. In order to permit the page of the book to be positioned upon the platen, the latter may be provided with a cut-out $c^3$. When the tracks are of the tiltable kind, as illustrated in said Fig. 11, the platen will be shifted automatically away from its normal position when the track-frame is tilted. In this arrangement, therefore, the platen may be shifted backward to permit access to the book or its support; or it may be displaced vertically when the track-frame is elevated. In some instances, this double shift proves to be a valuable feature.

In Fig. 12, the platen is likewise shiftable longitudinally, but is independent of the track-frame: At the front it rests upon posts $h$ (upstanding from the front frame-plate H) and between the tracks. At the rear, the platen is slidably supported in grooved members $H^2$ pivoted at $h^2$ on the rear frame-plate $H^3$. It will be noted that, when the platen is slid rearward, its weight will be disposed beyond the pivot $h^2$ and effect an automatic downward tilting of the platen. To limit the rearward shifting of the platen, stops $h^3$ may be disposed in the side-edges of the same, and these abut against the forward ends of the members $H^2$. In this instance, the track-frame may or may not be tiltable. Where it is tiltable, it and the platen are, by the arrangement here proposed, tilted by reason of the shifting of the weight from in front to the rear of their fulcrum.

While I have herein described my invention in more or less detail, it is to be understood that I do not limit myself to such details except in so far as they are specified in the claims.

Having thus described my invention and explained its general mode of operation, what I claim and desire to secure by Letters-Patent is:—

1. The combination with a base, and a book-support disposed therein, of a set of guide-tracks mounted on the base, and having their treads provided with a plurality of operative surfaces, and a platen supported by and shiftable on said tracks into a plurality of positions and relatively different planes.

2. The combination with a base, and a book-support disposed therein, of a set of guide-tracks mounted on the base, and having their treads provided with a plurality of operative surfaces, and a platen supported by and shiftable on said tracks into a plurality of positions and relatively different planes, said book-support also being shiftable relatively to said platen.

3. In a typewriter, a base, a book-support disposed therein, a set of tracks mounted on the base adjacent to said support, and provided with a plurality of elevations and depressions, and a platen supported by and shiftable on said tracks and adapted to be positioned in a plurality of planes as the platen traverses said elevations and depressions.

4. In a typewriter, a base, a book-support disposed therein, a set of tracks mounted on the base adjacent to said support, and provided with a plurality of elevations and depressions, a platen supported by and shiftable on said tracks and adapted to be positioned in one of a plurality of planes as the platen traverses said elevations and depressions, and means for locking said platen in position.

5. In a typewriter, a base, a book-support disposed therein, a set of tracks mounted on the base adjacent to said support, and provided with a plurality of elevations and depressions, a platen supported by and shiftable on said tracks and adapted to be positioned in one of a plurality of planes as the platen traverses said elevations and depressions, a movable track-frame, and means operated by said frame for locking said platen against movement.

6. In a typewriter, a base, a book-support disposed therein, a set of tracks mounted on the base adjacent to said support, and provided with a plurality of elevations and depressions, and a tiltable platen supported by and shiftable on said tracks and adapted to be positioned in one of a plurality of planes as the platen traverses said elevations and depressions.

7. In a typewriter, a base, a set of tracks disposed thereon and provided with depressions in its operative surface, and a platen supported by and shiftable on said tracks and adapted to be guided by said track-depressions into a relatively different plane from that which it occupies when traversing other portions of said tracks.

8. In a typewriter, a base, a book-support disposed therein, platen-supporting tracks mounted on said base adjacent to said book-support and provided with depressions in their treads, a platen shiftable relatively to said book-support, and members supported by said platen and adapted to traverse said tracks and, when in said depressions, to position said platen in its normal and operative plane and, when traveling upon the raised portions of said tracks, to position the platen in a relatively different plane.

9. In a typewriter, a base, a book-support disposed therein, platen-supporting tracks mounted on said base adjacent to said book-support and provided with depressions in their treads, a platen shiftable relatively to said book-support, rotary members supported by said platen and adapted to traverse said tracks and, when in said depressions, to position said platen in its normal and operative plane and, when traveling upon the raised portions of said tracks, to position the platen in a relatively different plane, and platen-locking means for retaining the platen in normal position.

10. In a typewriter, a base, a book-support disposed therein, platen-supporting tracks mounted on said base adjacent to said book-support and provided with depressions in their treads, a platen shiftable relatively to said book-support, rotary members supported by said platen and adapted to traverse said tracks and, when in said depressions, to position said platen in its normal and operative plane and, when traveling upon the raised portions of said tracks to position the platen in a relatively different plane, a frame fulcrumed on said base, and frame-operated platen-locking means.

11. In a typewriter, a base, a book-support disposed therein, platen-supporting tracks mounted on said base adjacent to said book-support and provided with depressions in their treads, said depressions being formed by two surfaces lying in relatively different planes, and one of said surfaces constituting a platen-abutment, a platen shiftable relatively to said book-support, and rotary members supported by said platen and adapted to traverse said tracks and, when in said depressions, to position said platen in its normal and operative plane and, when traveling upon the raised portions of said tracks to position the platen in a relatively different plane.

12. In a typewriter, a base, a book-support disposed therein, platen-supporting tracks mounted on said base adjacent to said book-support and provided with depressions in their treads, said depressions being formed by two surfaces lying in relatively different planes, and one of said surfaces constituting a platen-abutment, a platen shiftable relatively to said book-support, and rotary members supported by said platen and adapted to traverse said tracks and, when in said depressions, to position said platen in its normal and operative plane, and, when traveling upon the raised portions of said tracks to position the platen in a relatively different plane, said book-support also being shiftable and in the same direction as the platen.

13. The combination with a base, of a member for sustaining the page of a book and bodily shiftable on said base in a plurality of directions, namely, horizontally over the surface of the book and vertically into and out of operative relation to one or another side of the book when open.

14. The combination with a base, of a member for sustaining the page of a book and bodily shiftable horizontally over the surface of the book and vertically into operable relation to one or another side of the book when open, and means for supporting said member and guiding the same when being shifted both horizontally and vertically.

15. The combination of a base, of a member for sustaining the page of a book and bodily shiftable horizontally and vertically on said base over the surface of the book and to a position outside the area of said book.

16. The combination with a base, of a member for sustaining the page of a book and shiftable over the surface of the book and into operable relation to one or another side of the book when open, means for supporting said member and guiding the same when being shifted, and means disposed adjacent to said supporting and guiding means for retaining said member in normal position and against shifting out of such position.

17. The combination with a base, of a member for sustaining the page of a book and shiftable over the surface of the book and into operable relation to one or another side of the book when open, means for supporting said member and guiding the same when being shifted, means for retaining said member in normal position and against shifting out of such position, and means for limiting the extent of shifting travel of said member.

18. The combination with a base, of a traveling-book-support mounted thereon, and a page-supporting member horizontally shiftable relatively to said book-support and beyond the area of said book to expose it in its entirety.

19. The combination with a base, of a traveling-book-support mounted thereon, and a page-supporting member shiftable relatively to said book-support and beyond the area of said book to expose it in its entirety, and means for supporting said member and provided with plane-changing surfaces, whereby said member may when shifted occupy a plane relatively different from that when in normal position.

20. The combination with a base, of a traveling-book-support mounted thereon, and a page-supporting member shiftable relatively to said book-support and beyond the area of said book to expose it in its entirety, and means for supporting said member and provided with plane-changing surfaces whereby said member may when shifted occupy a plane relatively different from that when in normal position, and means for retaining said member in any of its positions.

21. In a typewriter, a base, a track-frame normally occupying a horizontal position thereon, and a platen mounted on said base independently of said track-frame and shiftable horizontally into and out of operable relation to said track-frame while the latter occupies its said normal horizontal position.

22. In a typewriter, a book-supporting base, a track-frame overlying said base, and a platen shiftable horizontally on said base relatively to said track-frame and from a position over the edge of a side of the book sustained by said supporting-base to a position beyond the said side-edge.

23. In a typewriter, a book-supporting base, a track-frame overlying said base, a platen shiftable horizontally relatively to said track-frame and to the sides of the book sustained by said supporting-base, and platen-supporting members provided with means for alternately positioning said platen in relatively different planes when shifted.

24. In a typewriter, a book-supporting base, a track-frame overlying said base, a platen shiftable horizontally relatively to said track-frame and to the sides of the book sustained by said supporting-base, platen-supporting members provided with means for alternately positioning said platen in relatively different planes when shifted, and means for retaining said platen in position in any of the planes in which it may be positioned.

25. In a typewriter, a base, a book-supporting device shiftably mounted on said base, and a platen shiftable on said base vertically into one of a plurality of positions, said book-supporting device and platen being shiftable relatively to each other and from a position where the platen overlies said book-support to a position where it is beyond the side edges of the support.

26. In a typewriter, a base, a book-supporting device mounted on said base, and shiftable from one side thereof to the other, and a platen also mounted on said base and shiftable from one side thereof to the other, said platen being adapted to overlie said support and shiftable to a position removed from said support.

27. In a typewriter, a base, a track-frame supported thereon, means for retaining said frame adjacent its rear end on said base against lateral movement, and a platen slidable on the base beneath the track-frame and in relation to the same and the base.

28. In a typewriter, a base, a tiltable track-frame supported thereon, means for retaining said frame adjacent its rear end on said base against lateral movement, and a platen slidable on the base beneath the track-frame and in relation to the same and the base.

29. A typewriter including in combination, a base, a track-frame supported on said base, and a platen shiftable on said base beneath and beyond the edges of the track-frame, said track-frame being hinged to tilt away from the platen.

30. A typewriter including in combination, a base, a track-frame supported on said base, platen-supporting members mounted on said base, a two-surfaced platen shiftable on said members beneath the track-frame, and means carried by said platen and coöperating with said members whereby either of its surfaces may face upwardly.

31. A typewriter including in combination, a base, a track-frame mounted thereon, platen-supporting means, and a platen supported thereon and bodily movable on said base into any of a plurality of horizontal positions relatively to said track-frame.

32. A typewriter including in combination, a base, a track-frame normally occupying a horizontal position thereon, platen-supporting means, a platen supported thereon and movable into any of a plurality of horizontal positions relatively to said track-frame while said frame retains its said normal horizontal position, and means for locking said platen in normal position.

33. A typewriter including in combination, a base, a shiftable platen, a frame connected to said base independently of the platen, means for holding said frame against sidewise movement, and means for supporting the platen within the printing-area and upon which means said platen is shiftable independently of said frame to a position outside of said printing-area and to one side of said frame.

34. A typewriter including in combination, a base, a frame mounted thereon, a shiftable platen, and means for supporting the platen in one plane within the printing-area and upon which means said platen is shiftable to a position outside of said printing-area and to one side of said frame and into a relatively different plane.

35. A typewriter including in combination, a base, a frame mounted thereon, a book-support sustained by said base, a shiftable platen, and means for supporting the platen normally in one plane relatively to said book-support and upon which means said platen is slidable into a relatively different horizontal plane with reference to said book-support.

36. A typewriter including in combination, a base, a frame mounted thereon, a book-support sustained by said base, a shiftable platen, means for supporting the platen normally in one plane relatively to said book-support and upon which means said platen is slidable into a relatively different horizontal plane with reference to said book-support, and means for retaining said platen in normal position.

37. The combination with a base, of a member for sustaining the page of a book and shiftable horizontally over the surface of the book, and means on said base for supporting said member and operating by the shifting of said member horizontally thereon to position the member into relatively different horizontal planes in relation to one or another side of the book when open.

38. In a typewriter, a base, a track-frame normally supported thereon in a horizontal plane, and a platen shiftable on said base beneath the track-frame while the latter is in its normal horizontal position and, also, vertically in relation to the same and to the base.

39. In a typewriter, a base, a track-frame normally supported thereon in a horizontal plane, and a platen mounted independently of said track-frame and shiftable beneath the same while it is in its normal horizontal position, and also shiftable vertically in relation to the track-frame and to the base.

40. The combination with a base, of a member for sustaining the page of a book and shiftable horizontally over the surface of the book and, also, bodily shiftable vertically into operable relation to one or another side of the book when open.

41. The combination with a base, of a member for sustaining the page of a book and shiftable laterally over the surface of the book and also, bodily shiftable vertically into operable relation to one or another side of the book when open, and means for supporting said member and guiding the same when being shifted.

42. The combination with a base, of a member for sustaining the page of a book and bodily shiftable on said base horizontally and vertically over the surface of the book and to a position outside the area of said book.

43. The combination with an elongated base, of a sheet-sustaining member slidable horizontally on said base for a portion of its length and then bodily shiftable vertically into a different horizontal plane.

44. The combination with an elongated base, of a member for sustaining the page of a book and shiftable horizontally over the surface of the book for a portion of the length of said base and also bodily shiftable vertically on said base in relation to said book.

45. A typewriter including in combination, a base, a frame mounted thereon, a shiftable platen, and means for supporting the platen within the printing-area and upon which means said platen is slidable independently of and beneath said frame to a position outside of said printing-area and to one side of said frame.

In testimony whereof I affix my signature in presence of two witnesses.

GEORGE W. DONNING.

Witnesses:
HARRY F. AMBROSE,
W. L. BILLMYER.

---

Copies of this patent may be obtained for five cents each, by addressing the "Commissioner of Patents, Washington, D. C."